United States Patent [15] 3,652,783
Tanaka et al. [45] Mar. 28, 1972

[54] COLOR FACSIMILE SYNCHRONIZATION SYSTEM

[72] Inventors: Yutaka Tanaka, Chofu-shi; Koichi Kobitsu, Tokyo, both of Japan

[73] Assignees: Matsushita Electric Industrial Co., Ltd., Osaka; Toho Denki Co., Ltd., Tokyo, Japan

[22] Filed: June 2, 1969

[21] Appl. No.: 829,382

[30] Foreign Application Priority Data

June 4, 1968 Japan ....................43/38935

[52] U.S. Cl. ....................178/5.2 R, 178/5.4 R, 178/5.4 C
[51] Int. Cl. ....................H04n 9/42
[58] Field of Search ....................178/5.2 R, 5.4 R, 5.4 CF, 5.4 C, 178/5.4 CD

[56] References Cited

UNITED STATES PATENTS

| | | | |
|---|---|---|---|
| 2,644,032 | 6/1953 | Maher et al. | 178/5.4 R CF |
| 2,681,946 | 6/1954 | Leuerenz | 178/5.4 R CF |
| 2,866,847 | 12/1958 | James | 178/6.8 |
| 2,868,870 | 1/1959 | Goldmark | 178/6.8 |
| 2,921,118 | 1/1960 | Benjamin | 178/5.4 |
| 3,475,548 | 10/1969 | McMann, Jr. | 178/6.8 |
| 3,506,775 | 4/1970 | McMann, Jr. | 178/5.2 |

*Primary Examiner*—Robert L. Griffin
*Assistant Examiner*—Donald E. Stout
*Attorney*—Stevens, Davis, Miller and Mosher

[57] ABSTRACT

This invention relates to a color facsimile synchronization system employed in a color facsimile system for transmitting a colored original in line sequence and reproducing the original in color at a receiving apparatus. The color facsimile synchronization system includes means for simultaneously effecting color and phase synchronization between both transmitting and receiving apparatus, synchronization being accomplished in the receiving apparatus by means of a phase signal generated in and transmitted from the transmitting apparatus. This invention also discloses an electronic circuit for electronically switching color signals which are transmitted in line sequence by the transmitting apparatus.

4 Claims, 16 Drawing Figures

YUTAKA TANAKA
& KOICHI KOBITSU
INVENTORS

BY Stevens, Davis, Miller & Mosher
ATTORNEY

COLOR FACSIMILE SYNCHRONIZATION SYSTEM

The present invention relates to a color facsimile synchronization system wherein the scanning operations of the transmitting and receiving sides are brought into synchronism with to each other, color synchronism and phase synchronism being obtained at the same time.

Furthermore, the present invention relates to an electronic circuit wherein each of the color signals R (Red), G (Green) and B (Blue) is electronically switched in sequence in order to transmit in line sequence each of the color signals in the transmitting side.

An object of the present invention is to provide a color facsimile system such that, in a transmitting and receiving system which line-sequentially transmits color signals, R, G and B, a phase signal is generated at the transmitting side corresponding to a specified one of the color signals. This phase signal makes the scanning operations conducted at the transmitting and receiving sides correspond to each other and ensures simultaneous attainment both of color synchronism and phase synchronism.

Another object of the present invention is to provide a phase synchronization system such that, at the receiving side of the color facsimile system according to the present invention, the phase signal which is transmitted from the transmitting side is detected and used to drive a rotary color filter, a main scanning system and a phase signal generator mechanically interlocked with one another.

A further object of the present invention is to provide a phase synchronization system such that, at the receiving side of the color facsimile system according to the present invention, the phase signal transmitted from the transmitting side and a phase signal generated at the receiving side, corresponding to the said specified one of the color signals, are synchronized by controlling a main driving system at the receiving side.

A still further object of the present invention is to provide a signal switching circuit for electronically and sequentially switching the color signals R, G, and B, which switching circuit is employed in the color facsimile system according to the present invention and comprises a plurality of gate circuits, feedback circuits, transformers and a common load.

Figure 1A:
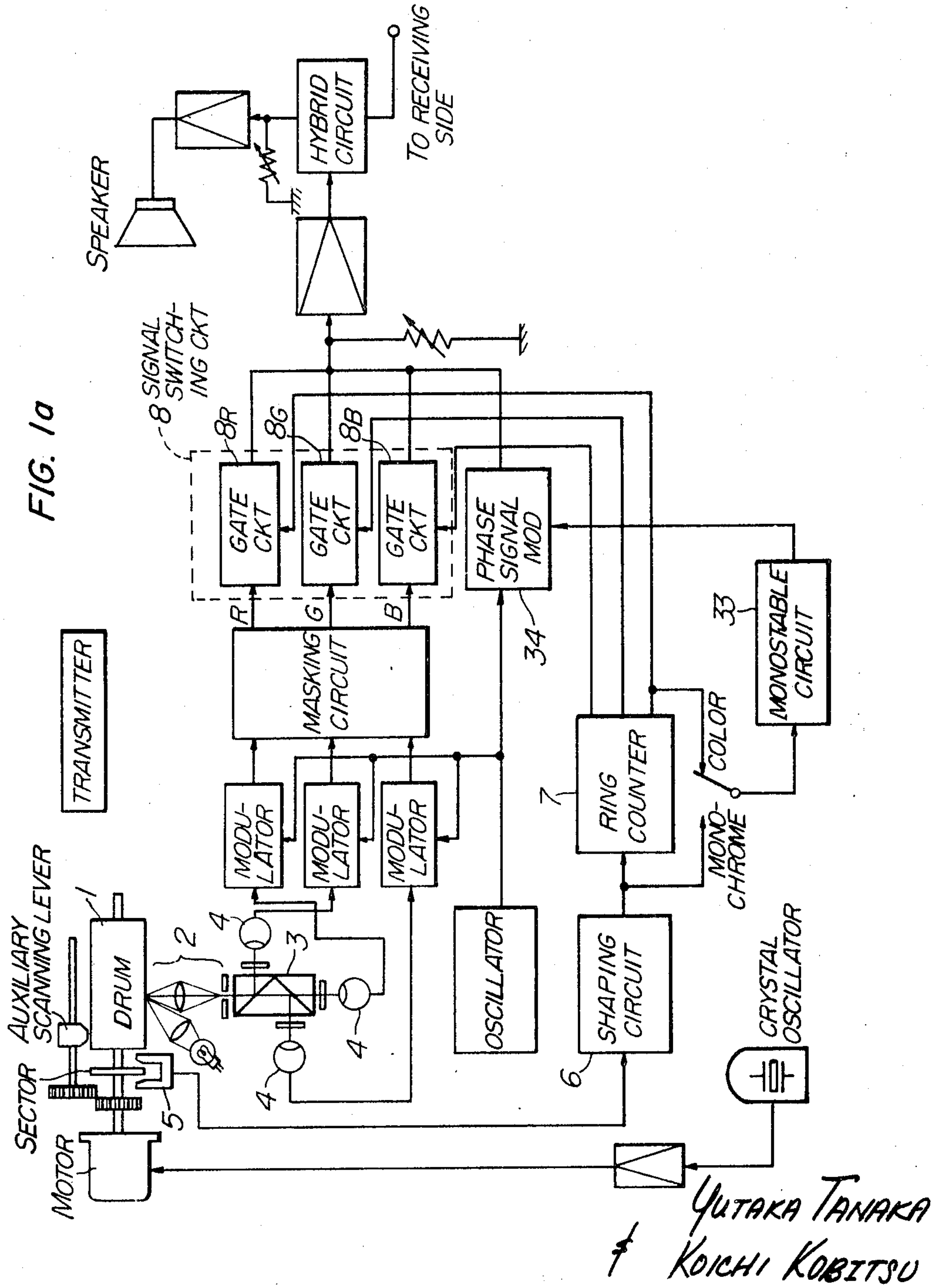
Figure 1B:
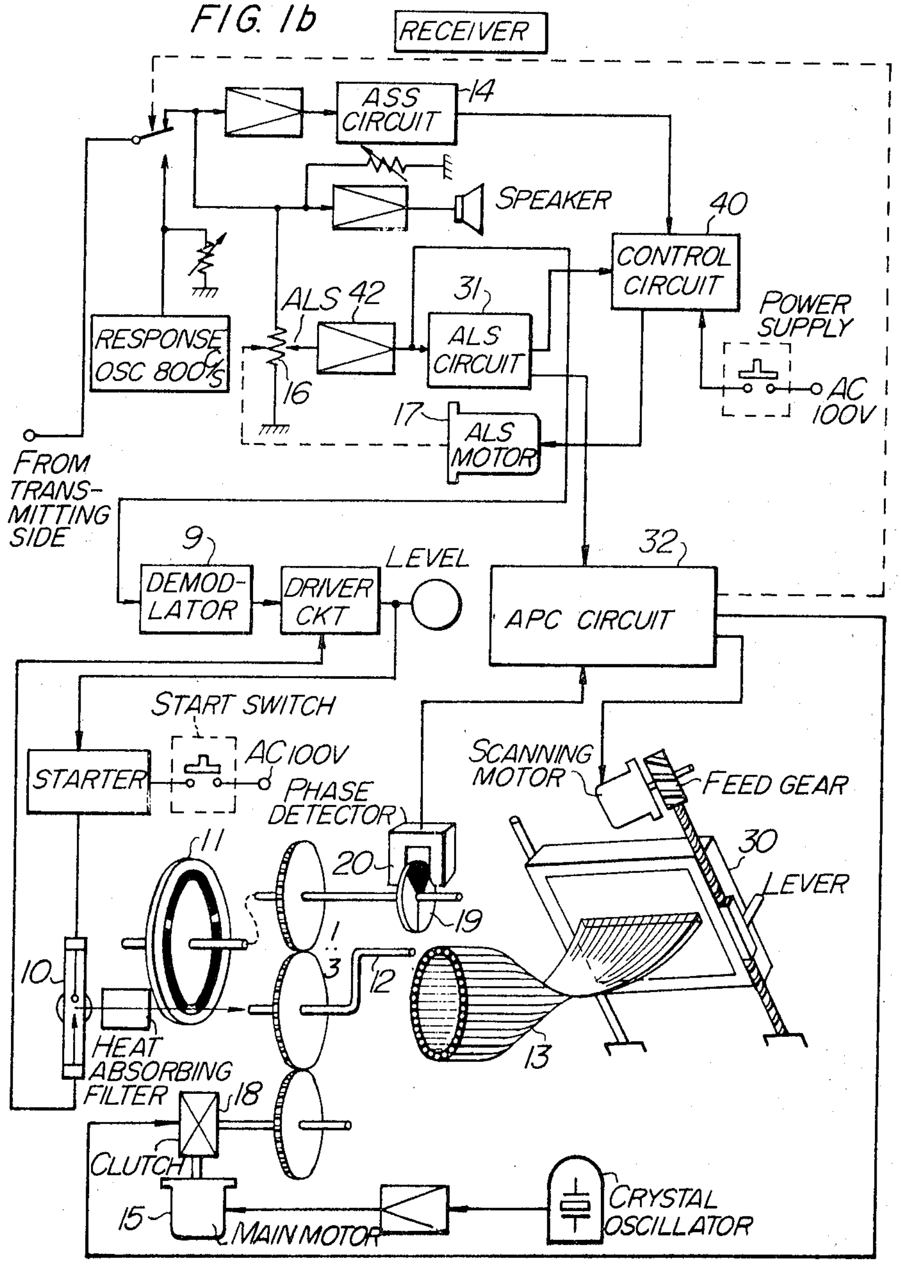
Figure 1C:
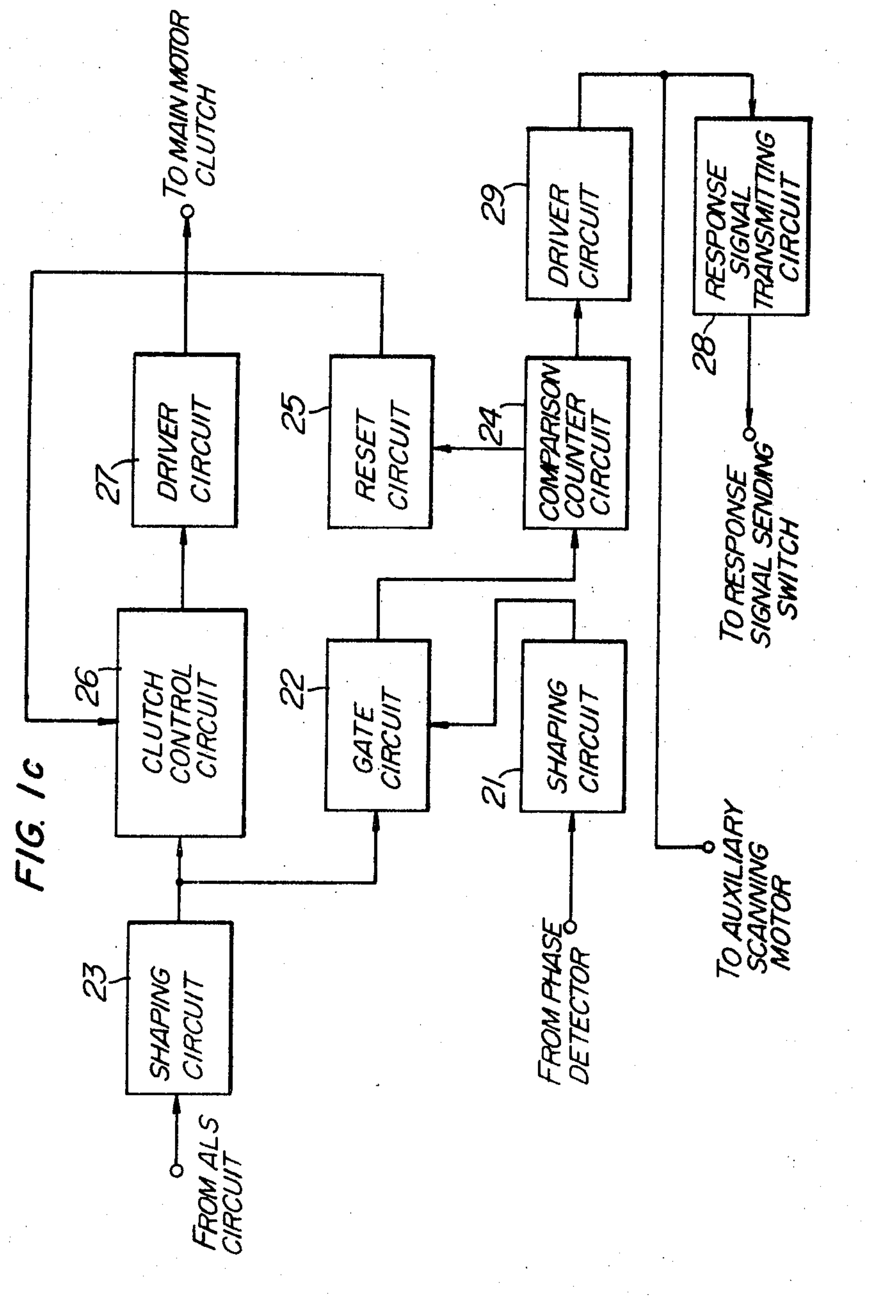

Other objects, features and advantages will be readily apparent from the following description taken in conjunction with the accompanying drawings, in which:

FIGS. 1*a* and 1*b* are schematic explanatory drawings of a color facsimile synchronization system according to the present invention;

FIG. 1*c* is a block diagram of an APC circuit shown in FIG. 1*b;*

Figure 2:
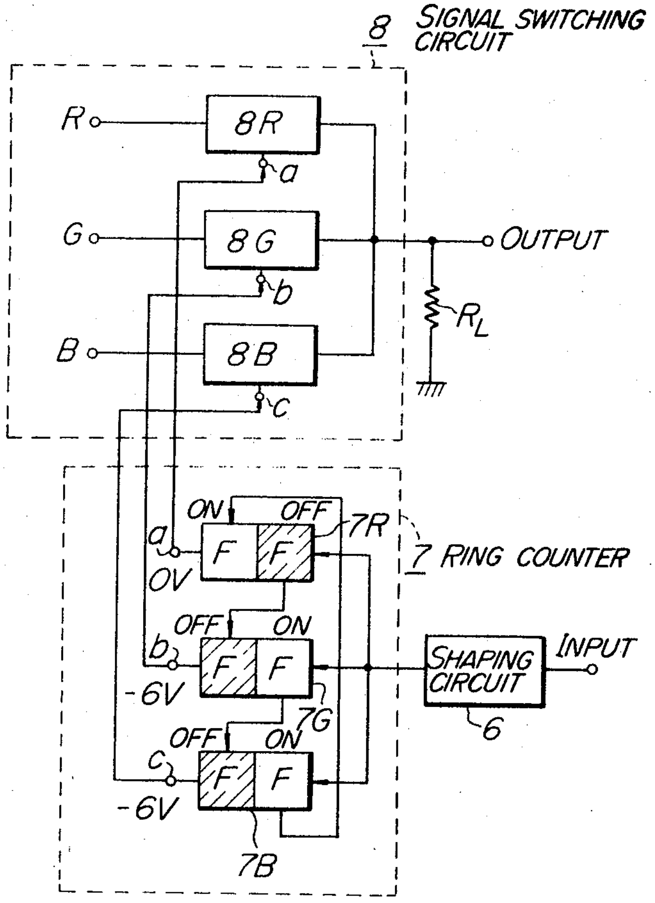

FIG. 2 is a block diagram of a shaping circuit, a ring counter and a signal switching circuit shown in FIG. 1*a;*

Figure 3A:
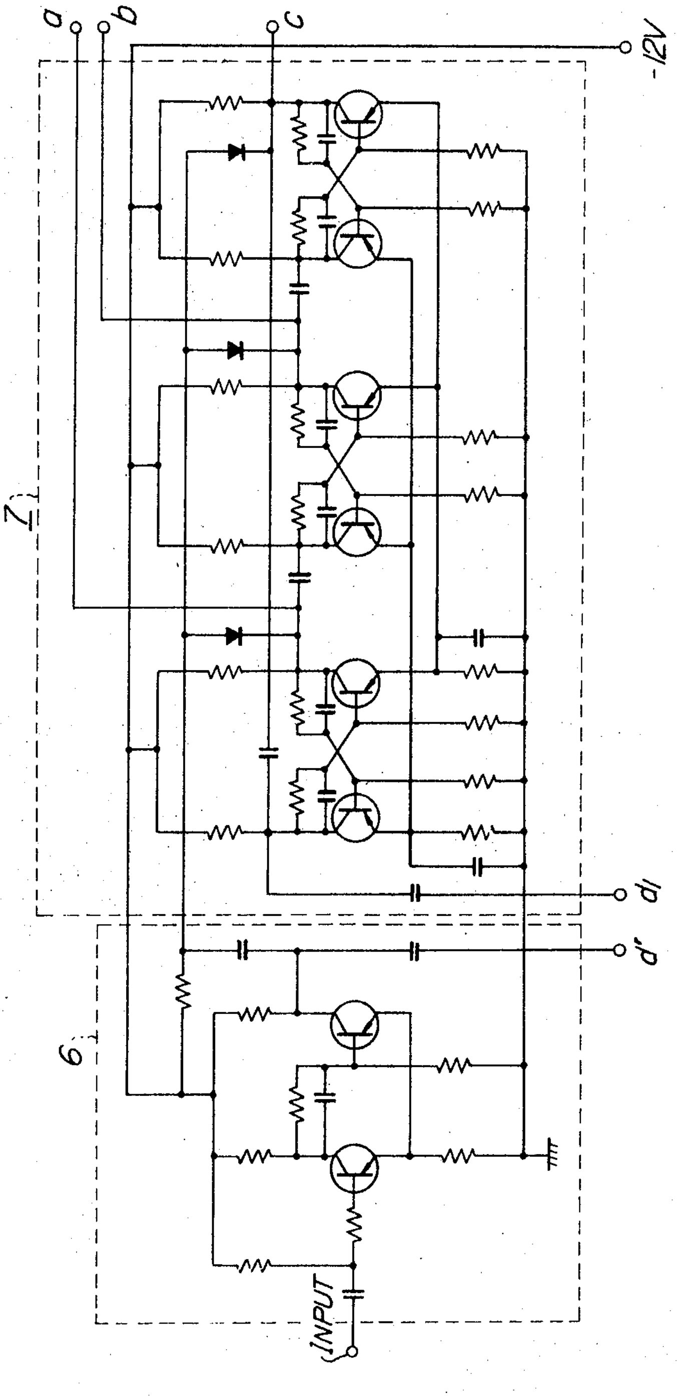
Figure 3B:
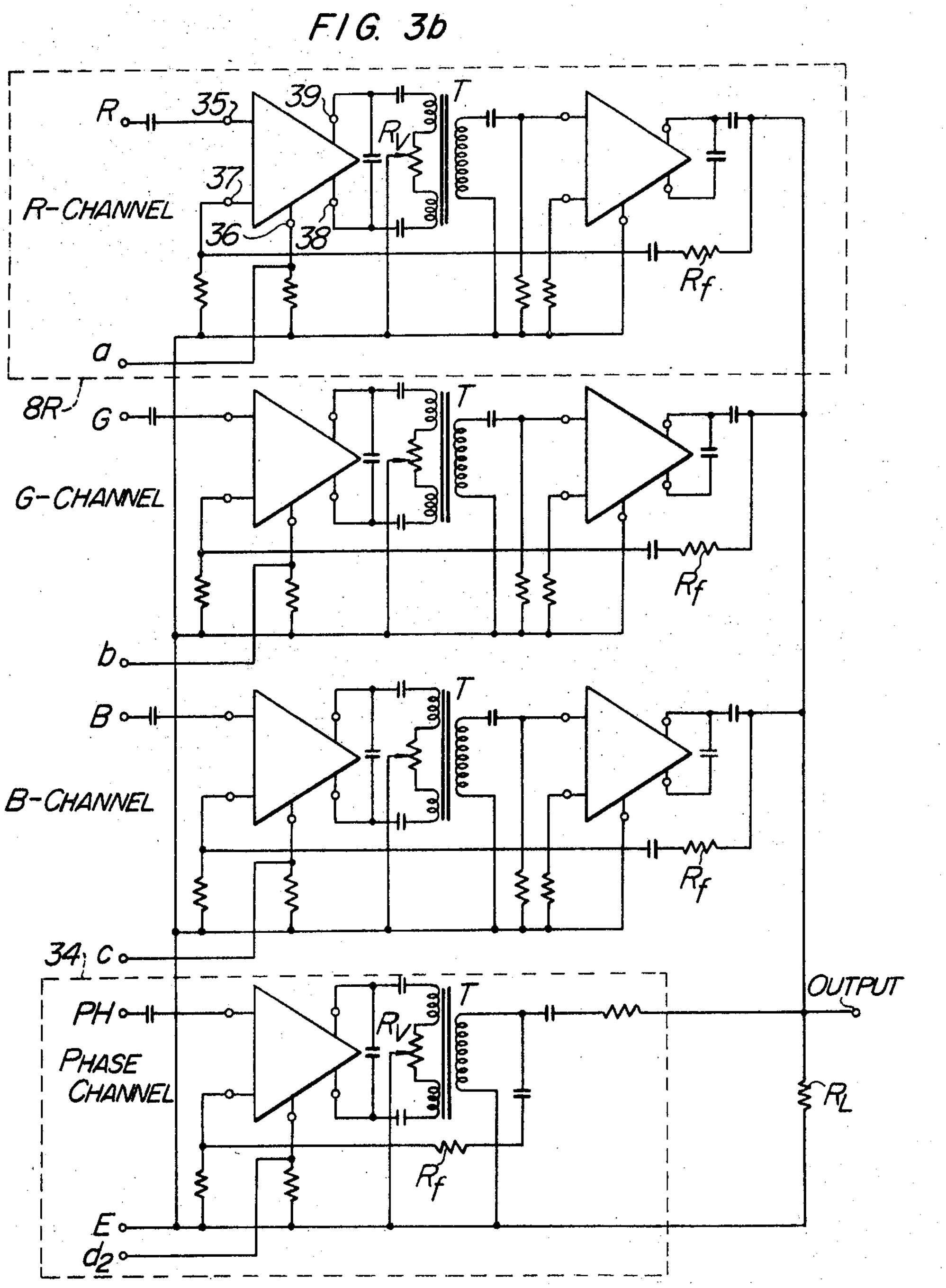
Figures 3C, 4A, 4B, 4C, 4D, 4E:
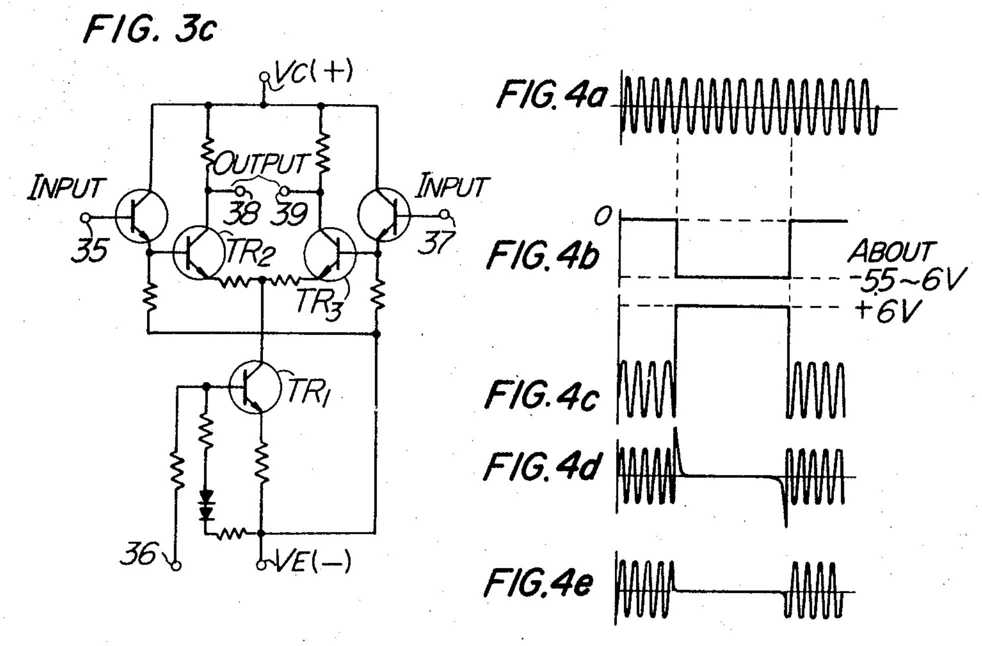

FIG. 3*a* is a detailed circuit diagram of a shaping circuit and a ring counter circuit shown in FIG. 2;

FIG. 3*b* is a detailed circuit diagram of signal switching circuits and a phase signal modulator;

FIG. 3*c* is a detailed circuit diagram for an essential portion in FIG. 3*b;* and FIGS. 4*a* to 4*e* and 5*a* to 5*d* are waveform diagrams for explaining the operations of the signal switching circuits shown in FIG. 3*b*.

A color facsimile synchronization system according to the present invention will be explained in conjunction with FIGS. 1*a* and 1*b*. In the transmitting side shown in FIG. 1*a*, a black-and-white or colored original is wound round a drum 1 and the main scanning performed by rotating the drum. Auxiliary scanning is performed by moving parallel to the drum shaft an optical system comprising a lens system 2, a dichroic prism 3 for color separation and photomultipliers. A phase detector 5 directly coupled to the drum shaft is provided for generating one phase pulse at every rotation of the drum 1, the phase signal pulse being generated corresponding to a specified peripheral position on the drum, which in turn generally corresponds to the position of the jointed portion of the original. Three phase pulses are generated, one for each rotation of the drum 1; that is, a group of three phase pulses generated by three rotations of the drum 1 are supplied to a ternary ring counter 7, or distributor, through a waveform shaping circuit 6. This group of three phase pulses is separated into three individual phase signals, each signal being fed to one of three gate circuits 8R, 8G and 8B of a signal switching circuit 8 to serve as a gating signal thereof.

The original is scanned and divided into a number of picture elements, and light corresponding to each picture element is separated into three primary colors in the order of G (Green), B (Blue) and R (Red) through the dichroic prism 3 for color separation, and each of the separated colors is converted into an electric signal proportional to the intensity of the light corresponding to each of the picture elements by means of the photomultiplier 4. After that, each of the color signals R, G and B modulates a carrier wave generated by an oscillator in a modulator and led to a masking circuit. Color correction is performed according to the density of the original in the masking circuit, and then each of the color signals is fed to a signal switching circuit 8. In the signal switching circuit 8, composed of gate circuits $8_R$, $8_G$ and $8_B$, each of the color signals R, G and B is electronically switched in sequence at every line of the main scanning by the above-mentioned gating signal. That is, there is employed a line-sequential transmission system in the present color facsimile system.

In order to obtain the color synchronism and the phase synchronism with the receiving side at the same time, it is necessary to send a phase signal from the transmitting side prior to the start of the auxiliary scanning. For that purpose, in the present invention, there is provided a structure whereby the phase signal is transmitted only at the time corresponding to a specified one of the color signals R, G and B which is to be transmitted in line sequence. For instance, if the transmission order of the color signals is R, G and B, the phase signal is sent only at the time corresponding to the R-signal as an example.

That is, with respect to the gating signals obtained by dividing by three in the ring counter 7, only at the time corresponding to the rising portion in the gating signal corresponding to the R-signal, or the falling portion in the gating signal corresponding to the B-signal, a monostable circuit 33 is operated so that the phase signal may be generated only at the time corresponding to the R-signal. This phase signal modulates a carrier wave in a phase signal modulator 34 and the modulated wave is sent to the receiving side.

Thus, the phase signal is sent to the receiving side for a given period of time prior to the transmission of the color signals in order to obtain synchronism with the receiving side.

The outline of the transmitting side in the color facsimile synchronization system according to the present invention has been described hereinbefore. Next, a detailed explanation will be given of the signal switching circuit which electronically switches each of the color signals R, G and B at every line of the main scanning, which is an object of the present invention.

Conventionally, a changeover switch, a switching relay, or the like has been employed for switching signals; however, because of unstable operation due to troubles in contact points, chattering, etc., and vibration or noise due to mechanical switching operation, they have been incapable of high speed switching.

The signal switching circuit in the transmitting side in the color facsimile synchronization system according to the present invention will now be explained in conjunction with FIGS. 2 to 5*a* through 5*d*. FIG. 2 is a block diagram of a shaping circuit, a ring counter and a signal switching circuit. In FIG. 2, a portion 7 enclosed a broken line is a ternary ring counter composed of flip-flop circuits $7_R$, $7_G$ and $7_B$. Numeral 6 designates a shaping circuit, whose input terminal is supplied with phase signal pulses generated at every revolution of the drum 1.

Numeral 8 designates a signal switching circuit composed of a gate circuit $8_R$ for R-channel, a gate circuit $8_G$ for G-channel and a gate circuit $8_B$ for B-channel. Each of the color signals R, G and B is respectively applied to each of the terminals R, G and B as an input signal thereto, and each of the outputs of the flip.flop circuits $7_R$, $7_G$ and $7_B$ in the ring counter 7 is respectively applied to each of control terminals a, b and c of the gate circuits $8_R$, $8_G$ and $8_B$ as a gating signal thereto. Each of the outputs of the gate circuits in the signal switching circuit 8 is connected to a common load $R_L$.

Each of the phase pulses generated at every revolution of the drum 1 is applied to the shaping circuit 6, and the output of the shaping circuit 6 is applied to each of the flip-flop circuits in the ring counter 7. In the ring counter 7, upon receipt of each of the phase pulses, any one of the three flip-flop circuits is inverted thereby producing an output sequentially by turns.

Figures 5A, 5B, 5C, 5D:
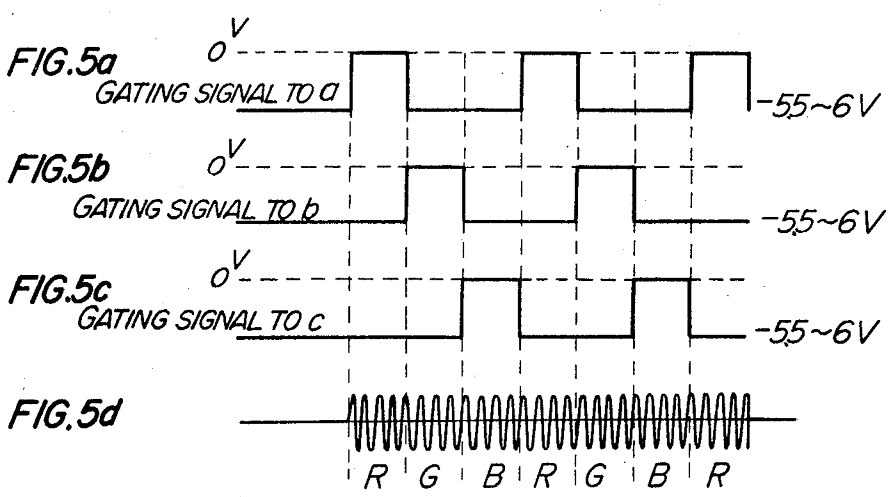

Hereupon, each of the rectangular waves having mutual time relation as shown in FIGS. 5*a*, 5*b* and 5*c* appears respectively at each of the outputs of the flip-flop circuits $7_R$, $7_G$ and $7_B$ in the ring counter 7 and is respectively applied to each of the control terminals a, b and c of the gate circuits corresponding to the respective color signals in the signal switching circuit 8. By means of these gating signals, each of the color signals R, G and B is switched in sequence at every line of the main scanning.

FIG. 3*a* is a detailed circuit diagram of the ring counter circuit which is shown in FIG. 2 as a portion 7 enclosed with a broken line and the shaping circuit 6. In FIG. 3*a*, a phase pulse applied to an input terminal thereof is led into the shaping circuit 6 composed of a Schmidt circuit. In this circuit, when a phase pulse signal, whose height exceeds a given value, is applied to its input, the circuit produces a rectangular wave of a constant voltage level at its output. This rectangular wave output is applied to each of the flip-flop circuits in the ring counter 7 as a driving pulse thereof. Each of the outputs of the flip-flop circuits in the ring counter 7 appears at each one of the terminals a, b and c and is respectively supplied to each of the control terminals a, b and c of the gate circuits for the channels R, G and B shown in FIG. 3*b*. Terminal $d_1$ in FIG. 3*a* is an output terminal of a phase pulse for phase synchronization and connected with a control terminal $d_2$ of a phase signal modulator 34 in FIG. 3*b* through a monostable circuit 33 shown in FIG. 1*a*. A terminal *d'* in FIG. 3*a* is an output terminal of a phase pulse for phase synchronization in the case of transmitting black-and-white (monochrome) signals, this pulse being the output waveform of the Schmidt circuit 6. Consequently, the color facsimile system according to the present invention is so constructed as to be able to transmit a monochrome original as well as a color original.

FIG. 3*b* is a detailed circuit diagram of a signal switching circuit 8 in FIG. 2 and shows, in order from top to bottom, each of the gate circuits for the channels R, G and B and the phase signal modulator 34. In FIG. 3*b*, there are employed differential amplifier type integrated circuits in the triangle portions, whose detailed circuit is shown in FIG. 3*c*. In FIG. 3*b*, the circuit for each channel is a gate circuit having an amplifying function, also being provided with a negative feedback circuit through a resistor $R_f$, whereby the output impedance thereof in its operating state is considerably small. At the input stage of the gate circuit for each channel, each of the terminals R, G and B is supplied with a corresponding input signal, and each of the control terminals a, b and c is supplied with a corresponding gate signal.

In each of the circuits shown in FIG. 3*b*, if a negative voltage having a value of about −6 v. is applied to the control terminal as a gating signal, the circuit loses its amplifying function, the signal transmission is interrupted, and the feedback function through the resistor $R_f$ is extinguished thereby causing a high output impedance.

The above relation will be explained, for example, with respect to the gate circuit $8_R$ for the R-channel, namely the circuit enclosed with a broken line in FIG. 3*b*. An input signal as shown in FIG. 4*a* is applied to the R-terminal in FIG. 3*b*, and a gating signal as shown in FIG. 4*b* is applied to the control terminal *a*. When the gating signal is negative as shown in FIG. 4*b*, a transistor $TR_1$, shown in the detailed drawing FIG. 3*c*, in the input stage of the gate circuit for the R-channel is cut off to make the resistance value of the emitter circuit of the transistors $TR_2$ and $TR_3$ infinitely large and to thereby make the circuit lose its amplifying function, and only a cutoff collector voltage as shown in FIG. 4*c* appears at the output terminals 38 and 39. Here, only when the gating signal is at zero potential do the transistors $TR_2$ and $TR_3$ act as amplifiers causing amplified waveforms of the input signals to appear at the output terminals.

Accordingly, when a rectangular wave as shown in FIG. 4*b* is applied to the control terminal *a*, as a result, an output waveform as shown in FIG. 4*c* appears across each of the of the input stage of the gate circuit output terminals 38 and 39 and the earth terminal E, and at the secondary side of the transformer T. A DC component is blocked out thereby to produce a waveform as shown in FIG. 4d. In this case, through the transformer T, differentiated waveforms of the portions of the gating signal remain in the waveform, and so, if a variable resistor Rv attached to the transformer T is adjusted to balance out the differentiated waveforms, a waveform completely free from the influence of the gating signal as shown in FIG. 4*e* is obtained across the secondary side of the transformer T. Therefore, both the transformer T and the variable resistor Rv serve for removal of the DC component from the output waveform.

In order to repeat in sequence the above-mentioned process with respect to each of the gate circuits for the color channels R, G and B, by applying in sequence a signal as shown in FIG. 4*a*, for example, to each of the input terminals R, G and B in FIG. 3*b* and the respective rectangular waves having time relation as shown in FIGS. 5*a*, 5*b* and 5*c* to the control terminals *a*, *b* and *c*, each of the gate circuits for the color channels R, G and B produces an amplified output only when a positive pulse is applied thereto. In this case, as mentioned hereinbefore, the output impedance of the circuit in the cutoff state is far higher than the one in the operating state, hence, the gate circuits for all the channels can be connected with the same common load $R_L$. Consequently, across the common load $R_L$, a signal waveform formed by a succession of the color signals R, G and B in sequence shown in FIG. 5*d* is obtained. Also with respect to the phase signal modulator 34, in the same way as the gate circuits for the color channels R, G and B, by applying a carrier wave from an oscillator as an input signal to the input terminal PH thereof and the phase signal from the above-mentioned monostable circuit 33 in FIG. 1*a* to the control terminal $d_2$ thereof, a modulated phase signal is obtained at the output thereof. In this embodiment, after the synchronization with the receiving side has been assured through transmitting the phase signal to the receiving side for a given time prior to the transmission of the color signals (namely before the start of scanning), each of the color signals R, G and B is transmitted in line sequence. Of course in this case, while the phase signal is transmitted, a negative voltage is being applied to each of the control terminals of the gate circuits for the color signals R, G and B. Conversely, while the color signals R, G and B are transmitted, a negative voltage is being applied to the control terminal $d_2$ of the phase signal modulator.

As described above, since the switching at every line for scanning each of the color signals R, G and B, which is one of the objects of the present invention, is performed by means of the signal switching circuit, each of the color signals can be switched accurately and rapidly. Furthermore, troubles due to faulty contact points, unstable operation, vibration, noise or the like, as brought about when conventional mechanical switching is employed, can be avoided.

The foregoing description has been concerned with the transmitting side. Next, an explanation will be given of the receiving side in conjunction with FIG. 1*b*. In the receiving side, a circular to linear scanning conversion device employing optical fibers is used for main scanning to obtain a recording in a plane scanning system. An auxiliary scanning is performed by moving a camera back enclosing a sensitive material therewithin in the direction perpendicular to the linear scanning portion of the optical fibers. Each of the color signals transmitted in line sequence from the transmitting side, after detection in a demodulator 9, is led to a xenon discharge tube 10 so as to cause intensity modulation thereof. After that, light radiated from the discharge tube is colored by passing through a rotary color filter 11 (a filter composed of a rotary disc having three color filters R, G and B, each occupying one third of an annular portion therewithin), transmitted through a rotary glass fiber 12, and led into the main scanning system composed of optical fibers 13 one end of which having a circular arrangement, while the other of which having a linear arrangement so that a color picture reproduction may be effected by exposing the sensitive material to the scanning light.

In this case, when the color signals R, G and B transmitted from the transmitting side arrive at the receiving side in sequence, it is necessary to select the position of the rotary color filter 11 in synchronism with the order of arrival thereof and to expose the sensitive material to the light from the xenon discharge tube 10. For that purpose, in the present invention, prior to the start of the auxiliary scanning, the position of the rotary color filter 11 is determined according to the phase signal transmitted from the transmitting side to correspond only to a specified one of the color signals R, G and B (the R-signal has been chosen in the embodiment shown in FIG. 1*a*).

This operation together with the other operations in the receiving side will be explained in detail hereinafter. In the receiving side, only an ASS (Automatic Start Stop) circuit 14 is always in the operating state. First, the ASS circuit 14 which is tuned to the carrier wave (including the phase signal) transmitted from the transmitting side, is started by reception of this signal causing a main power source switch to be closed and a main motor 15 start its rotation. Both main motors in the transmitting and receiving sides are driven by means of crystal oscillators having the same frequency, thus employing an independent synchronization system.

The levels of received signals are not constant due to attenuation caused by external means, such as intermediary lines. On the other hand, the (maximum) current corresponding to the white level of signals should be conformed to the rated current of the xenon discharge tube 10. In other words, the level of an input signal to the demodulator 9 must have a predetermined value.

Consequently, each time an input signal is received, the input signal level must be adjusted and set to a fixed value.

It is an object of an ALS (Automatic Level Set) circuit 31 in cooperation with a potentiometer 16 and an ALS motor 17 to effect this adjustment and setting. While ALS circuits for this purpose are generally known, an outline of the operation of the ALS circuit 31 will be given hereunder.

When no input signal is received, a movable arm of the potentiometer 16 remains at a position connected to ground. When an input signal is received, the ASS circuit 14 operates to supply power to the ALS motor 17 through a control circuit 40 to thereby start the ALS motor 17. The ALS motor turns the movable arm of the potentiometer 16 to increase an input signal to a succeeding amplifier 42. The input signal is amplified by the amplifier 42 and then applied to the ALS circuit 31. When the level of an input signal to the ALS circuit 31 reaches a predetermined value, the ALS circuit 31 produces an output to operate the control circuit 40 which, in turn, interrupts the supply of current to the ALS motor 17 to thereby stop the ALS motor 17. In this way, the level of an input signal to the amplifier supplied from the potentiometer 16 is set at a constant level.

Then, if the phase signal transmitted from the transmitting side is detected in an APC (Automatic Phase Control) circuit 32, a clutch 18 of the main motor 15 is engaged, and by means of a gear train, the rotary glass fiber 12, the rotary color filter 11 and a phase comparison sector 19 start their rotation simultaneously.

The revolution ratio of the rotary glass fiber 12 to the phase comparison sector 19 has been chosen to be three to one; therefore, one phase pulse is generated in a phase detector 20 in cooperation with the phase comparison sector 19 at every three revolutions of the rotary glass fiber 12. The phase pulse corresponds to the phase signal transmitted from the transmitting side which corresponds only to a specified one of the color signals R, G and B.

The rotary color filter 11 and the phase comparison sector 19 have the same rotational speed.

Therefore, if the phase signal generated in the phase detector in the receiving side coincides with the phase signal transmitted from the transmitting side, synchronism of the color filter with the color signals as well as phase synchronism between the transmitting and receiving sides with each other is simultaneously obtained.

More precisely, in the APC circuit shown in FIG. 1c, the phase pulse generated in the phase detector 20 is supplied through a shaping circuit 21 to a gate circuit 22 as a gating signal thereof. The signal input of the gate circuit 22 is supplied with the phase pulse which is transmitted from the transmitting side and passes through the other shaping circuit 23. In this case, the width of the phase pulse generated in the receiving side to be employed as a gating signal is chosen to be slightly larger than that of the phase pulse transmitted from the transmitting side. In the gate circuit 22, a gate output is had only when the phase pulse transmitted from the transmitting side coincides with the one generated in the receiving side. In the present embodiment, in order to prevent malfunction, both the phases are taken to be synchronized with each other only when the coincidence takes place three times in succession, that is, three phase pulses are successively obtained as the gate output, which pulses are counted in a comparison counter circuit 24. When the comparison counter circuit 24 counts three phase pulses, it supplies a "pulse coincidence" signal to a reset circuit 25 and a driver circuit 29. Then the reset circuit 25 is locked without supplying a signal to a clutch control circuit 26. In the event that the clutch 18 malfunctions due to a spurious noise signal or the like, without the gate circuit 22 at the same time delivering three or more successive signals, the reset circuit 25 produces a signal for stopping the operation of the clutch 18, which signal is applied to the clutch control circuit 26 to interrupt the supply of a current to the clutch 18 and to thereby stop the operation of the clutch 18. In that case, the clutch 18 is disengaged to stop the rotation of the rotary color filter 11, the phase comparison sector 19 and the rotary glass fiber 12. When the next phase signal transmitted from the transmitting side goes into the APC circuit 32, the clutch control circuit 26 produces a clutch control signal to cause the clutch 18 to be engaged through a driver circuit 27, thereby starting the rotation of the rotary color filter 11, the phase comparison sector 19 and the rotary glass fiber 12. Thus, the same operation as before is repeated.

Now, when the phase synchronism is obtained, a response signal having a frequency of 800 Hz. is sent to the transmitting side through the operation of a response signal transmitting circuit 28. The transmitting side assures the response signal sent from the receiving side and then starts the auxiliary scanning to transmit the picture signal. The receiving side, after the transmission of the response signal, also starts the auxiliary scanning through a driver circuit 29 to receive the picture signal.

During the receiving operation, if the reception is disabled because of a fault in the transmission line and said transmission line is not restored in ten seconds, the power source is turned off and the camera back 30 is automatically restored to the original state thereof.

What is claimed is:

1. In a facsimile system for transmitting a color image from a transmitter to a receiver, a synchronization system comprising, in the transmitter a. first scanning means for optically scanning said image and converting said image into a plurality of signals each corresponding to a specific color, b. first phase detector means for generating a phase signal corresponding to a line of scanning of said image, c. distributor means coupled to said first phase detector means, said distributor means generating sequentially upon receiving said phase signal a plurality of gating signals each corresponding to a specific color, d. gating means coupled to said first scanning means and said distributor means, said gating means transmitting a signal corresponding to a specific color upon receipt from said distributor means of a gating signal corresponding to said specific color, and e. Phase signal modulation means coupled to said distributor means, said phase signal modulation means transmitting a phase synchronization signal at intervals corresponding to the generation of a preselected one of said gating signals, and, in the receiver, f. demodulation means for receiving and demodulating said transmitted signal, g. a light source coupled to said demodulation means, the intensity of the light emitted by said source corresponding to the intensity of the received signal, h. a displaceable color filter divided into a plurality of sections, each section having a color corresponding to one of said specific colors, i. second scanning means for optically scanning a recording material and reproducing said color image, j. second phase detector means coupled to said color filter and displaceable in synchronism therewith, and k. phase comparison means coupled to said second phase detector means for comparing the phase of the transmitted signal with the output of said second phase detector means, said second scanning means starting scanning operation when the phase of the received signal and the output of said second phase detector means are in substantial coincidence.

2. A facsimile system as defined by claim 1 which further comprises driving means having its input coupled to said phase comparison means and its output to said displaceable color filter, to said second scanning means and to said second phase detector means; said driving means driving said color filter, said second scanning means and said second detector means when the phase of the received signal and the output of said second phase detector means are in substantial coincidence.

3. A facsimile system as defined by claim 1 wherein said color filter is circular and is rotated about a fixed axis by said driving means.

4. A color facsimile synchronization system according to claim 1 characterized by a signal switching circuit provided therewithin comprising a plurality of gate circuits having an amplifying function and feedback circuits each thereof feeding a part of the output of the corresponding gate circuit back to the input side thereof, being provided with a transformer for blocking the DC component in the amplifier stage, having the outputs of the respective gate circuits connected to a common load, and electronically switching in sequence each of the color signals by means of the gating signal corresponding thereto.

* * * * *

UNITED STATES PATENT OFFICE
CERTIFICATE OF CORRECTION

Patent No. 3,652,783 Dated March 28, 1972

Inventor(s) Yutaka TANAKA and Koichi KOBITSU

It is certified that error appears in the above-identified patent and that said Letters Patent are hereby corrected as shown below:

The second assignee should read as follows:

-- Matsushita Graphic Communication Systems, Inc. -- by change of Name filed June 18, 1971.

The following foreign application should also be listed under "Foreign Application Priority Data":

| | | |
|---|---|---|
| June 4, 1968 | Japan | 43/38935 |
| June 4, 1968 | Japan | 43/38939 |
| June 4, 1968 | Japan | 43/38940 |
| June 4, 1968 | Japan | 43/38946 |

Signed and sealed this 17th day of April 1973.

(SEAL)
Attest:

EDWARD M.FLETCHER,JR.
Attesting Officer

ROBERT GOTTSCHALK
Commissioner of Patents